US005181700A

United States Patent [19]

Yonezawa

[11] Patent Number: 5,181,700

[45] Date of Patent: Jan. 26, 1993

[54] CLAMPING APPARATUS

[75] Inventor: Keitaro Yonezawa, Kobe, Japan

[73] Assignee: Kabushiki Kaisha KOSMEK, Hyogo, Japan

[21] Appl. No.: 862,725

[22] Filed: Apr. 3, 1992

[30] Foreign Application Priority Data

Apr. 12, 1991 [JP] Japan .................................. 3-108531

[51] Int. Cl.[5] .................................................. B23Q 3/08

[52] U.S. Cl. ........................................... 269/24; 269/25; 269/30; 269/137; 269/138

[58] Field of Search ........................ 269/24, 25, 27, 30, 269/32, 35, 137, 138, 254 CS

[56] References Cited

U.S. PATENT DOCUMENTS

| | | | |
|---|---|---|---|
| 3,512,794 | 5/1970 | Lohman | 269/138 |
| 3,595,112 | 7/1971 | DeGeorse | 269/137 |
| 3,700,227 | 10/1972 | Sessody | 269/24 |
| 4,365,792 | 12/1982 | Johns | 269/24 |
| 4,932,640 | 6/1990 | Shirakawa | 269/32 |
| 5,071,109 | 12/1991 | Yonezawa | 269/137 |
| 5,108,079 | 4/1992 | Yonezawa et al. | 269/24 |

FOREIGN PATENT DOCUMENTS

| | | | |
|---|---|---|---|
| 1215283 | 11/1959 | France | 269/30 |
| 1-154833 | 6/1989 | Japan . | |

*Primary Examiner*—J. J. Swann
*Attorney, Agent, or Firm*—Bacon & Thomas

[57] ABSTRACT

A clamping first piston (11) is inserted into a locking second piston (17) inserted into a cylinder bore (9) of a housing (4). A clamping member (7) is fixedly secured to the left portion of the first piston (11). A clamping first actuation chamber (21) is formed on the right side of both those pistons (11)(17), and an enclamping second actuation chamber (25) is formed on the left siede of the second piston (17). A wedgy space (30) is formed between the outer circumferential surface of the first piston (11) and the cylinder bore (9). A locking wedge (31) is inserted into the wedgy space (30) from right side and an unlocking engaging portion (34) is opposed to an unlocking engaged portion (33) of the first piston (11) from left side, so that these wedge (31) and the engaging portion (34) are fixedly secured to the second piston (17).

7 Claims, 8 Drawing Sheets

CLAMPING APPARATUS

BACKGROUND OF THE INVENTION

1. Field of the Invention

The present invention relates to a clamping apparatus adapted to operationally press an object to be clamped or fixed (referred to as a clamped object hereinafter) such as a mold, a work pallet and the like onto a fixed angular table of a processing machine such as an injection molding machine, a machining center and so on, and more particularly to a fluid clamping apparatus with a clamp locking means which operates to prevent the clamped object from being unclamped by an external force when a clamping fluid pressure abnormally lowers.

2. Description of Prior Art

Such a clamping apparatus is disclosed in Japanese Provisional Patent Publication No. 1-154833.

As shown in FIG. 13, this is adapted to advance a first piston 312 from an unclamping position Y (a figure depicted by an alternate long and two short dashes line) to a clamping position X (a figure depicted by a solid line) by means of a fluid pressure within a first actuation chamber 313 of a clamping first cylinder 309, and a locking chamber 326 is communicated crosswise with the first actuation chamber 313 with a locking wedge 327 inserted into the locking chamber 326.

This wedge 327 is adapted to be so moved as to be changed over between a locking position M (a figure depicted by a solid line) for advancement to the first actuation chamber 313 and an unlocking position N (a figure depicted by an alternate long and two short dashes line) for retraction into the locking chamber 326 by means of a fluid pressure within a second actuation chamber 393 of a second cylinder 329 through a second piston 339. A third actuation chamber 340 is formed below the second piston 339, and a locking push spring 395 is mounted within the second actuation chamber 393.

When a clamping arm 307 is changed over from an unclamping condition illustrated by a figure depicted by an alternate long and two short dashes line to a clamping condition illustrated by a figure depicted by a solid line, a pressurized fluid is discharged from the third actuation chamber 340 and the pressurized fluid is supplied to both the first actuation chamber 313 and the second actuation chamber 393. Thereupon, the first piston 312 is advanced leftwards from the unclamping position Y so as to swing a clamping arm 307 toward the clamped object 302. Simultaneously, the wedge 327 is advanced from the unlocking position N to the locking position M by means of the fluid pressure within the second actuation chamber 393 and the resilient force of the push spring 395, so that its wedge surface 348 can be engaged wedgewise with a wedge receiving surface 349 of the first piston 312. Subsequently, the first piston 312 is pushed strongly to the clamping position X by means of a resultant force obtained from both a wedgy engaging force of the wedge 327 advanced subsequently thereto and a fluid pressure within the first actuation chamber 313.

In addition to a problem that a height of a fluid clamp becomes tall because the second cylinder 329 projects upwardly from the first cylinder 309, there is also the following problems associated with the above-mentioned conventional construction.

That is, in the above-mentioned wedgy engagement type fluid clamp, the wedge 327 is adapted to be actuated for locking to the locking position M against a dynamical friction force acting between both surfaces of the wedge surface 348 and the wedge receiving surface 349 at an end stage of clamping actuation. To the contrary, at an initial stage of unclamping actuation it is necessary to unlockingly actuate the wedge 327 to the unlocking position N against a statical friction force which is remarkably larger than the dynamical friction force. It is the reason why a coefficient of statical friction is remarkably larger than a coefficient of dynamical friction and a metal contact is caused because a lubricating oil between both those surfaces 348, 349 would have been squeezed out by an excessively large surface pressure at the end stage of clamping actuation.

Further, since a resultant force obtained from the fluid pressure within the second actuation chamber 393 and the resilient force of the locking push spring 395 is utilized at the time of locking actuation of the wedge 327, the locking push force becomes large. Therefore, when the wedge 327 is surely actuated for unlocking, it is necessary to enlarge a cross-sectional area of the second actuation chamber 340 by making the second piston 339 having a large diameter. Then, it is necessary to set an inclination angle $\alpha$ of the wedge surface 348 to such a value as being small as possible in order to surely actuate the wedge 327 for unlocking. Therefore, a lower portion of the first piston 312 projects backwardly.

Accordingly, the fluid clamp becomes larger in size because of its taller height, its second piston 339 having a larger diameter and its longer first piston 312.

There are also the following problems.

Within a duration from an initial stage of the clamping actuation illustrated in a figure depicted by the alternate long and two short dashes line to a beginning of the wedgy engagement, the lower surface of the wedge 327 is brought into strong contact with the outer surrounding surface of the first piston 312 by means of the resultant force obtained from the fluid pressure within the locking second actuation chamber 393 and the resilient force of the locking push spring 395. Therefore, the outer surrounding surface is apt to be damaged and thus to cause an oil leakage from the first actuation chamber 313. This problem may come out as a conspicuous evil influence when a clamping thickness of the clamped object such as the mold 302 would become large. That is, it is the reason why when the clamping thickness would become large, a load for the first piston 312 may become large at a stage of a small swinging angle of the clamp arm 307 and also an interferential degree between the outer surrounding surface of the first piston 312 and the lower surface of the wedge 327 may become large.

SUMMARY OF THE INVENTION

It is an object of the present invention to downsize a fluid clamp. It is another object of the present invention to keep a good hermetical condition within a clamping first actuation chamber. For accomplishing the above-mentioned objects, the present invention is characterized in that a fluid clamp is constructed as follows.

A clamping first piston and a locking second piston having a larger diameter than that of the first piston are inserted into a cylinder bore of a housing so as to be hermetically slidable substantially coaxially in the fore and rear direction. A clamping first actuation chamber is formed behind those pistons. A clamping member is connected to the front portion of the first piston. An unclamping second actuation chamber is formed before the second piston. A clamping locking wedgy space is so formed as to be tapered forwardly between the outer circumferential surface of the first piston and the cylinder bore. A locking wedge inserted into the wedgy space from back side and an unlocking engaging portion opposed to an unlocking engaged portion of the first piston from front side are provided in the second piston.

The present invention functions as follows.

Under the unclamping condition, the pressurized fluid within the first actuation chamber has been discharged and the pressurized fluid has been supplied to the second actuation chamber. Thereby, the second piston has been retracted so that the engaging portion has retracted the first piston to the unclamping position through the engaged portion.

When changing over from the unclamping condition to the clamping condition, the pressurized fluid within the second actuation chamber is discharged and the pressurized fluid is supplied to the first actuation chamber. Thereupon, the first piston and the second piston are advanced by means of the fluid pressure so that the clamping member is brought into pressing contact with the clamped object (for example, a metal mold) from above. Subsequently, the second piston is advanced only the distance of locking stroke relative to the first piston an advancement of which has been prevented. Thereby, the locking wedge goes to wedgewise engaging with the outer circumferential surface of the first piston and the cylinder bore so as to strongly frictionally secure the second piston within the cylinder bore. Thereby, even when a pressure within the first actuation chamber lowers abnormally due to a fluid leakage from a pressurized fluid supply piping and so on, the first piston can be held at the aforementioned clamping position.

Since the present invention is constructed and functions as mentioned above, the following advantages can be obtained.

Since it is enough to form only one cylinder bore in the housing of the fluid clamp and it is unnecessary to upwardly project the second cylinder from the first cylinder like the above-mentioned conventional embodiment, the height of the fluid clamp becomes lower. Further, since the locking stroke becomes shorter and the length of the first piston becomes shorter due to the substantially coaxial arrangement of both those pistons, also the length of the fluid clamp in the fore and back direction becomes shorter. Accordingly, the fluid clamp can be made smaller in dimension. Further, since the locking stroke can be short, also an operation time of the clamp can be made shorter.

Since the locking wedge can be actuated in the axial direction of the cylinder bore due to the substantially coaxial arrangement of both those pistons, it is possible to prevent an interference of the wedge with a sealing surface of the cylinder bore. Thereby, it becomes possible to extend a service time of the fluid clamp by keeping a good condition of the sealing interface between the cylinder bore and the second piston or the first piston.

Further, since only one cylinder bore is enough for the fluid clamp, the machining becomes easier and a manufacturing cost of the fluid clamp can be reduced.

Furthermore, since at the time of clamping operation of the hydraulic clamp, as set forth, the clamping member is brought into contact with the clamped object and then the second piston advances relative to the first piston so as to lock the first piston, an allowable range of the clamping thickness of the clamped object becomes larger.

In the above-mentioned construction, when the second piston is externally fitted to the piston body of the first piston, the fluid clamp can be made smaller in dimension because the overall length of the first piston can be shorter correspondingly to its overlapped portion.

Further, in the respective above-mentioned constructions, when the cylinder bore is opened in the front surface of the housing in the forwardly declining manner and the clamping member is fixedly secured to the front portion of the first piston, it is possible to shorten the length of the housing in the fore and back direction so as to make the length of the fluid clamp shorter.

BRIEF DESCRIPTION OF THE DRAWINGS

The invention is further described by way of illustrative example with reference to the annexed drawings, in which:

FIG. 1 is a vertical sectional side view illustrating a clamping condition of a hydraulic clamp;

FIG. 2 is a plan view of the hydraulic clamp;

FIG. 3 is a vertical sectional side view illustrating an unclamping condition of the hydraulic clamp;

FIG. 4 is a side view of a locking wedge of the hydraulic clamp;

FIG. 10 is a view corresponding to FIG. 1;

FIG. 11 is a perspective view of a collet;

DESCRIPTION OF THE PREFERRED EMBODIMENTS

Now, embodiments of the present invention will be explained with reference to the drawings hereinafter.

First Embodiment

FIGS. 1 through 4 show a first embodiment.

Figure 1:
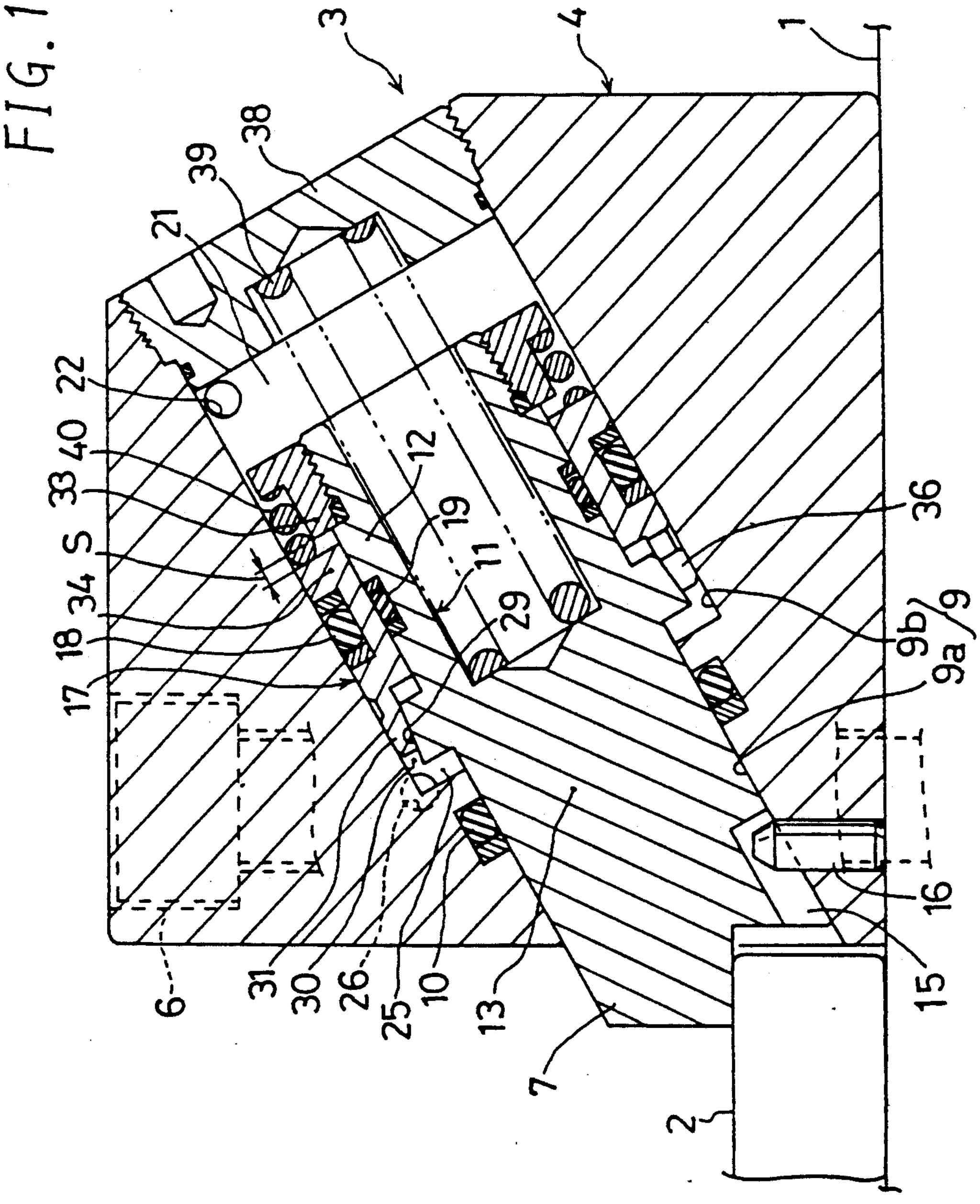
FIGS. 1 through 4 show a first embodiment of the present invention.
Figure 2:
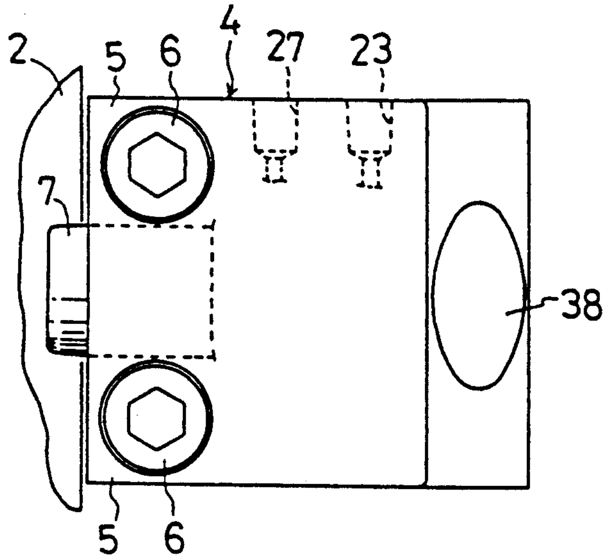

As shown in a vertical sectional side view of FIG. 1 and a plan view of FIG. 2, a mold 2 as a clamped object is fixedly secured onto a fixed angular table 1 of an injection molding machine by means of a hydraulic clamp (a fluid clamp) 3. This hydraulic clamp 3 comprises a housing 4 having opposite side walls 5, 5 secured to the fixed angular table 1 by means of two bolts 6, 6 and a clamping member 7 extended from the housing 4 so as to press the mold 2 obliquely from above.

A cylinder bore 9 formed in the housing 4 in the forwardly declining manner comprises a small diameter bore portion 9*a* and a large diameter bore portion 9*b* communicating with each other coaxially in the fore and back direction. A clamping first piston 11 is inserted oil-tightly into the small diameter bore portion 9*a* through a packing 10. This first piston 11 comprises a piston body 12 and a piston rod 13. The clamping member 7 is protruded integrally from the front portion of the piston rod 13 in the forwardly declining manner, and a rotation stopping pin 16 is inserted into a lower groove 15 of the clamping member 7. A locking second piston 17 is inserted oil-tightly between the piston body 12 of the first piston 11 and the large diameter bore portion 9*b* of the cylinder bore 9 through two packings 18, 19.

A clamping actuation chamber 21 formed behind the both those pistons 11, 17 is communicated with a first pressurized oil supply/discharge port 23 (refer to FIG. 2) through a first oil passage 22. An unclamping second actuation chamber 25 having an annular configuration formed before the second piston 17 is communicated with a second pressurized oil supply/discharge port 27 (refer to FIG. 2) through a second oil passage 26.

A wedge receiving surface 29 is projected in a backwardly tapered manner from the outer circumferential surface of the piston rod 13 of the first piston 11, and a clamp locking wedgy space 30 is formed between the wedge receiving surface 29 and the large diameter bore portion 9*b* of the cylinder bore 9. A locking wedge 31 fixedly secured to the front portion of the second piston 17 is inserted into the wedgy space 30 from back side. An unlocking engaging portion 34 formed in the back portion of the second piston 17 is opposed to an unlocking engaged portion 33 secured to the back portion of the first piston 11, from front side.

Figure 4:
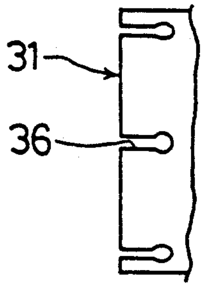

As shown in FIG. 4, the wedge 31 has a plurality of slits 36 in the peripheral direction so as to be diametrally readily resiliently deformable. A clamping first push spring 39 is mounted between an end plate 38 of the first actuation chamber 21 and the first piston 11, and a locking second push spring 40 is mounted between both those pistons 11, 17.

The above-mentioned hydraulic clamp 3 operates as follows.

Figure 3:
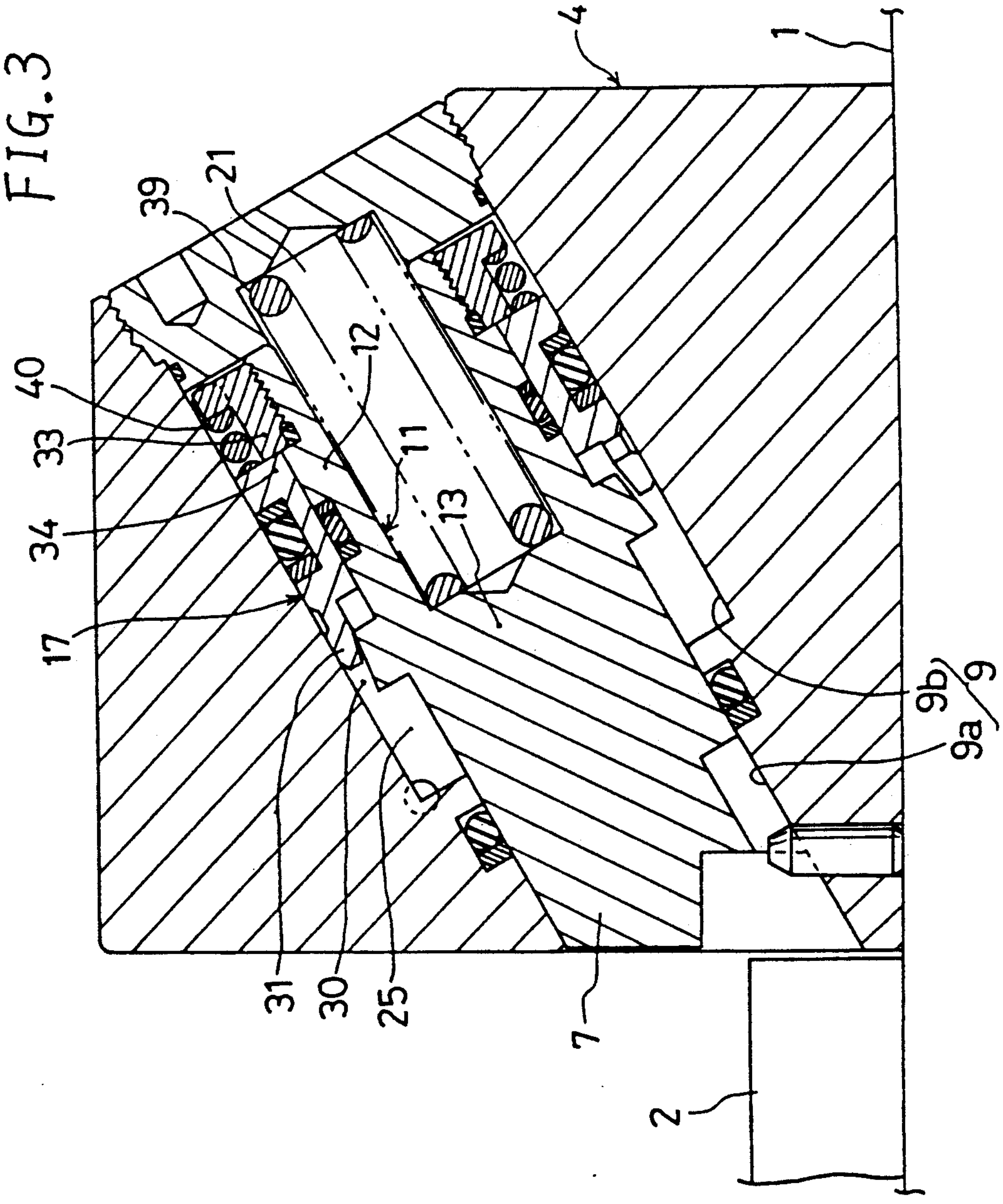

Under the unclamping condition illustrated in FIG. 3, a pressurized oil has been discharged from the first actuation chamber 21 and the pressurized oil has been supplied to the second actuation chamber 25. Thereby, the second piston 17 has been retracted against the second push spring 40 and the first piston 11 has been retracted by the unlocking engaging portion 34 to the unclamping position against the first push spring 39 through the engaged portion 33.

When changing from the above-mentioned unclamping condition to the clamping condition illustrated in FIG. 1, the pressurized oil within the second actuation chamber 25 is discharged and the pressurized oil is supplied to the first actuation chamber 21. Thereupon, the first piston 11 and the second piston 17 are advanced in the forward declining direction by means of a hydraulic pressure so that the clamping member 7 can be brought into pressing contact with the mold 2 from above.

Subsequently, the second piston 17 is advanced only the distance of a locking stroke S relative to the first piston 11 which has been prevented from advancing. Thereby, a wedge 31 goes for engagement between the wedge receiving surface 29 of the first piston 11 and the large diameter bore portion 9*b* of the cylinder bore 9 so as to frictionally secure the second piston 17 within the large diameter bore portion 9*b*. Even when the hydraulic pressure within the first actuation chamber 21 abnormally lowers or vanishes due to a leakage of the pressurized oil from a pressurized oil supply piping and so on, the first piston 11 can be held at the clamping position.

That is, the wedge 31 and the wedge receiving surface 29 are made from such a selected material as decreasing a coefficient of friction between these contact surfaces and/or applied with such a surface treatment as decreasing the coefficient of friction therebetween. In addition, the wedge 31 and the large diameter bore portion 9*b* are made from such a selected material as comparatively increasing a coefficient of friction between these contact surfaces and/or applied with such a surface treatment as comparatively increasing the coefficient of friction therebetween.

At the time of vanishment of the hydraulic pressure and so on, an external disturbing force such as a gravity force and a machining reaction force acting on the mold 2 is apt to retract the first piston 11 even a little through the clamping member 7. Thereupon, the wedge receiving surface 29 engages more strongly with the wedge 31 frictionally secured to the large diameter bore portion 9*b* so as to attain a stronger locking therebetween.

According to the above-mentioned construction, the following advantages can be obtained.

Figure 13:
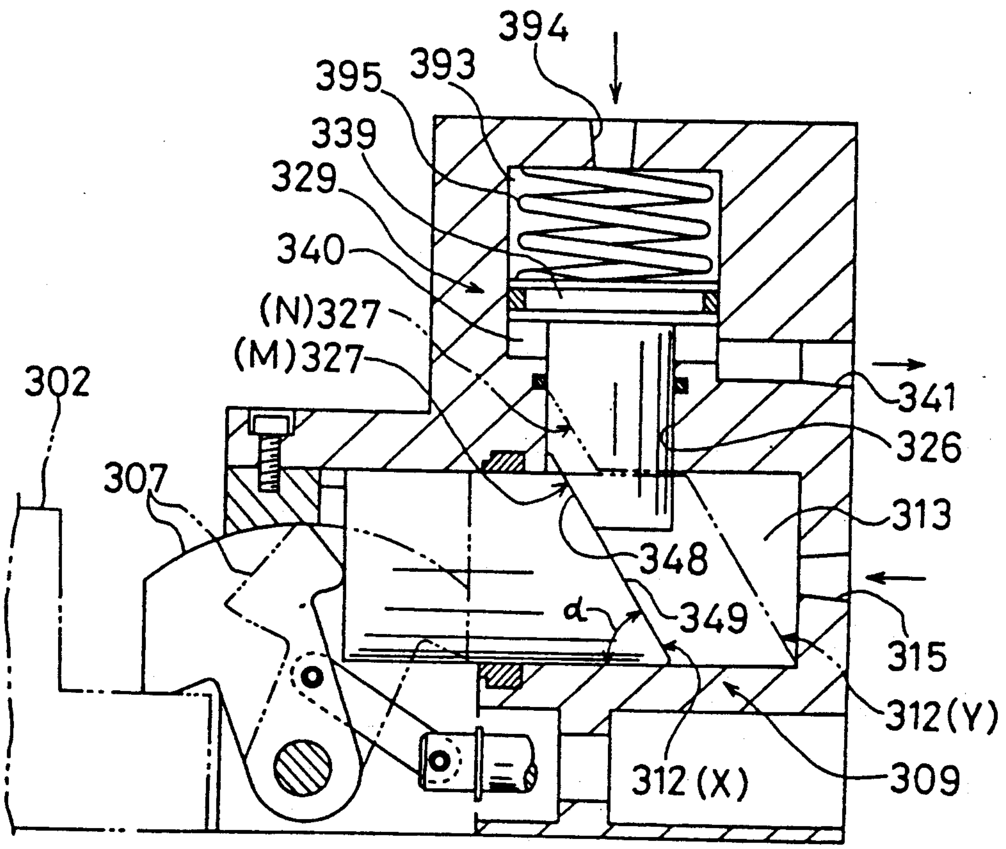
PRIOR ART FIG. 13
FIG. 13 shows a conventional embodiment and is a view corresponding to FIG. 1.

Since it is enough to form only one cylinder bore 9 in the housing 4 of the hydraulic clamp 3 and it is not necessary to project a second cylinder 329 upwardly from a first cylinder 309 as above-mentioned conventional embodiment (refer to FIG. 13), the height of the hydraulic clamp 3 becomes lower. Further, since the locking stroke S becomes shorter and the length of the first piston 11 becomes shorter due to the substantially coaxial arrangement of both the pistons 11, 17, also the length of the hydraulic clamp 3 in the fore and back direction becomes shorter. Accordingly, the hydraulic clamp 3 can be made smaller in dimension.

Since the locking stroke S can be made shorter, also the clamping operation time becomes shorter. Further, since it is possible to set the inclination angle of the wedge receiving surface 29 to a desired value, the hydraulic clamp 3 adapted to perform various kinds of clamping workings can be readily manufactured.

Since both the pistons 11, 17 are arranged substantially coaxially, it is possible to actuate the locking wedge 31 in the axial direction of the cylinder bore 9 so that an interference of the wedge 31 with the sealing surface of the large diameter bore portion 9*b* of the cylinder bore 9 can be prevented. Thereby, a service time of the hydraulic clamp can be extended by keeping the good condition of the sealing interface between the first piston 11 and the cylinder bore 9.

Further, since it is enough to provide only one cylinder bore 9 for the hydraulic clamp, its machining becomes easier and the manufacturing cost of the hydraulic clamp can be reduced.

Furthermore, since at the time of clamping operation of the hydraulic clamp 3, as set forth, the clamping member 7 is brought into contact with the mold 2 and then the second piston 17 advances relative to the first piston 11 so as to lock the first piston 11, an allowable range of the clamping thickness of the mold 2 is larger.

Since as a clamping force the hydraulic clamp 3 can make use of the resilient forces of both the push springs 39, 40 in addition to the hydraulic thrusts of both the piston 11, 17, its clamping capability becomes larger.

(Variant)

Figure 5:
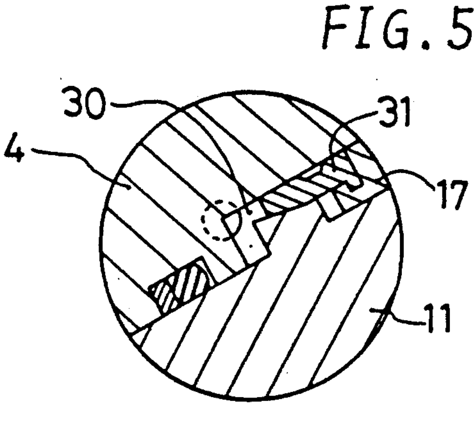
FIG. 5 shows a variant of the first embodiment and is a partial view showing a principal portion thereof correspondingly to FIG. 1.

As shown in a variant of FIG. 5, when the locking wedge 31 is provided separately from the second piston 17, a selection freedom for a material and a surface treatment of the wedge 31 becomes larger so that a most suitable design of the hydraulic clamp can be readily attained.

FIGS. 6 through 9, FIGS. 10 and 11 and FIG. 12 show a second embodiment through a seventh embodiment respectively. Incidentally, in these embodiments, a component member having the same construction as that of the first embodiment are, in principle, designated by the same symbol.

Second Embodiment

Figure 6:
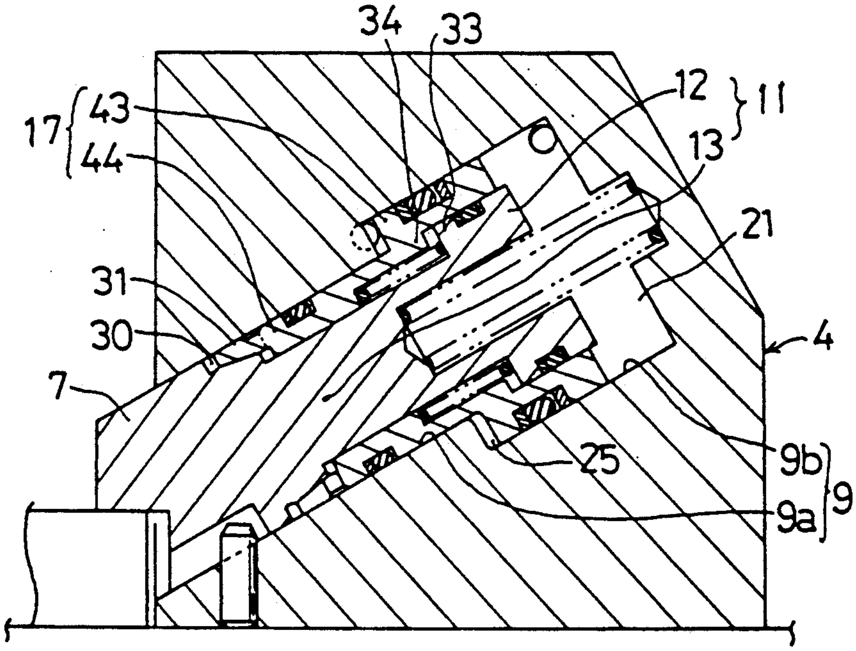
FIG. 6 shows a second embodiment of the present invention and is a view corresponding to FIG. 1.

In a second embodiment shown in FIG. 6, the second piston 17 comprises a piston body 43 and a piston rod 44 with the piston rod 44 oil-tightly inserted into the small diameter bore portion 9*a* of the cylinder bore 9. The locking wedge 31 is fixedly secured to the front portion of the piston rod 44, and the unlocking engaging portion 34 is fixedly secured to the piston body 43. In this case, since the wedgy space 30 and the wedge 31 are disposed outside a dipping surface of a working oil, a frictional fixing force becomes larger so as to attain a strong clamp locking force.

Third Embodiment

Figure 7:
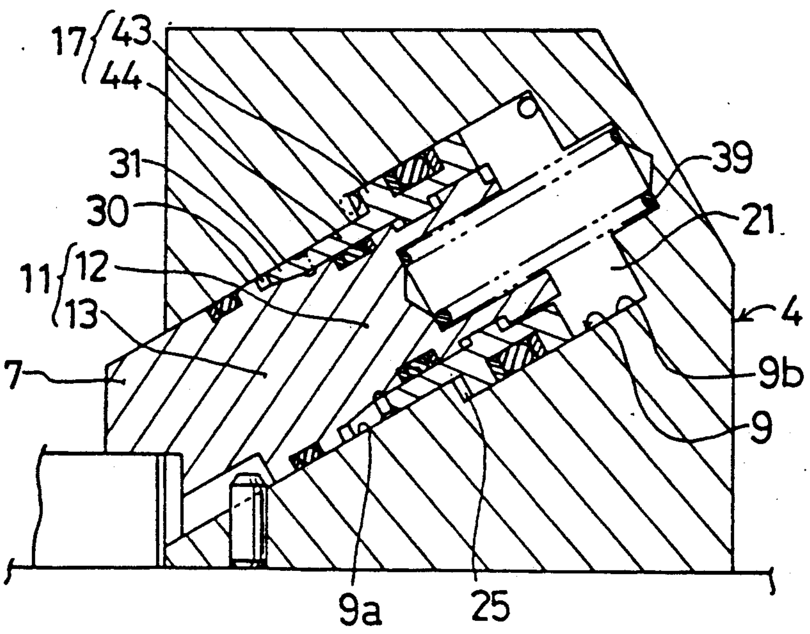
FIG. 7 shows a third embodiment of the present invention and is a view corresponding to FIG. 1.

In a third embodiment shown in FIG. 7, a piston rod 44 of the second piston 17 is externally fitted to the piston body 12 of the first piston 11 and the piston rod 44 is inserted into the small diameter bore portion 9*a* of the cylinder bore 9. The piston rod 13 of the first piston 11 is oil-tightly inserted into the front portion of the small diameter bore portion 9*a*. In this case, since the second actuation chamber 25 can be made in a small diameter by reducing the diameter of the piston body 12 of the first piston 11, it is enough to supply only a small amount of oil at the time of unclamping actuation and it is possible to shorten the unclamping actuation time. Incidentally, the push spring comprises only the clamping first push spring 39.

Fourth Embodiment

Figure 8:
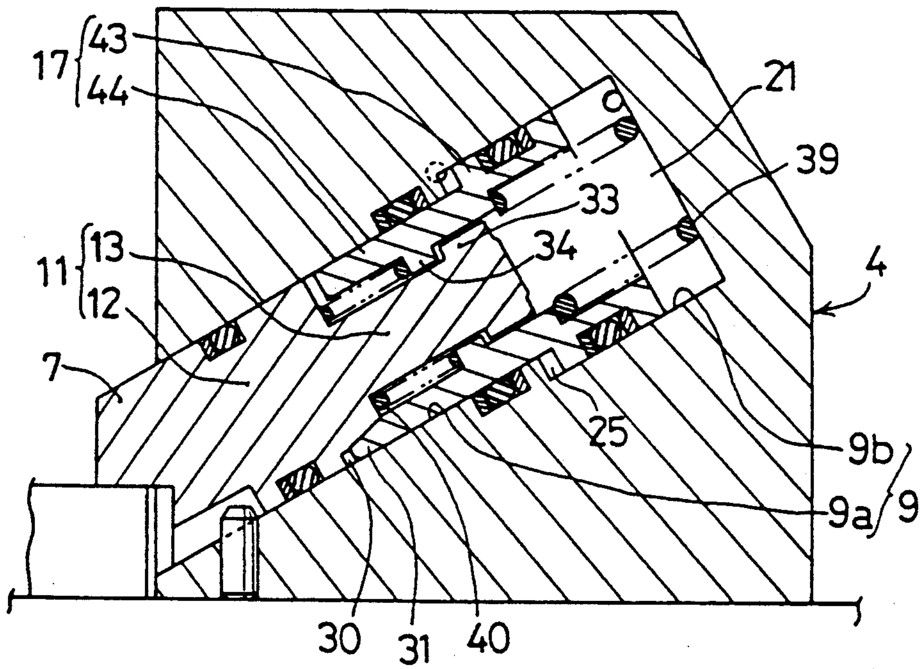
FIG. 8 shows a fourth embodiment of the present invention and is a view corresponding to FIG. 1.

In a fourth embodiment shown in FIG. 8, the first piston 11 comprises the piston body 12 oil-tightly inserted into the front portion of the small diameter bore portion 9*a* of the cylinder bore 9 and the piston rod 13 projected backwardly from the piston body 12. The piston rod 44 of the second piston 17 is inserted into the small diameter bore portion 9*a* and the locking wedge 31 is fixedly secured to the front lower portion of the piston rod 44. The first push spring 39 is mounted between the housing 4 and the second piston 17. The second push spring 40 is mounted between the engaging portion 34 of the second piston 17 and the first piston 11.

Incidentally, the aforementioned wedge 31 may be provided in the front upper portion of the piston rod 44.

Fifth Embodiment

Figure 9:
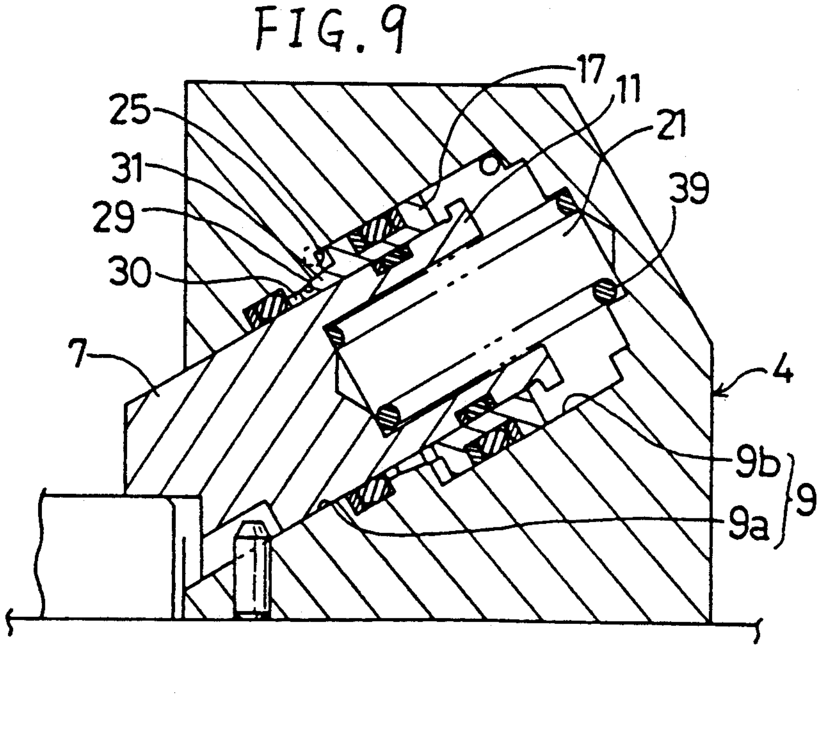
FIG. 9 shows a fifth embodiment of the present invention and is a view corresponding to FIG. 1.

A fifth embodiment shown in FIG. 9 is presented by modifying the third embodiment (refer to FIG. 7) as follows. Namely, the wedgy space 30 is formed between the wedge receiving surface 29 formed in the reduced-diameter shoulder portion of the cylinder bore 9 and the outer circumferential surface of the first piston 11. In this case, the first piston 11 is made shorter by omitting the wedge receiving surface 29, so that the hydraulic clamp can be made smaller in dimension.

Sixth Embodiment

Figure 10:
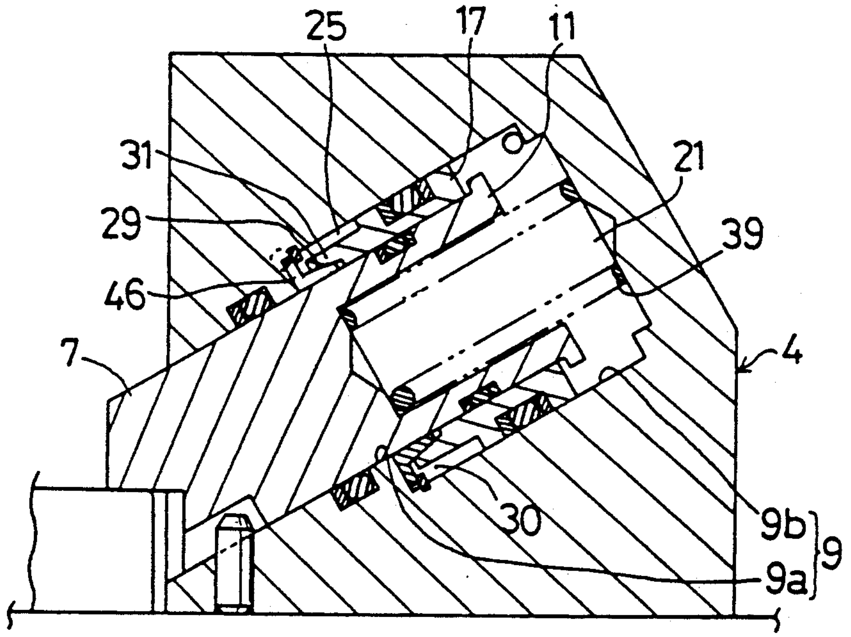
FIGS. 10 and 11 show a sixth embodiment of the present invention.
Figure 11:
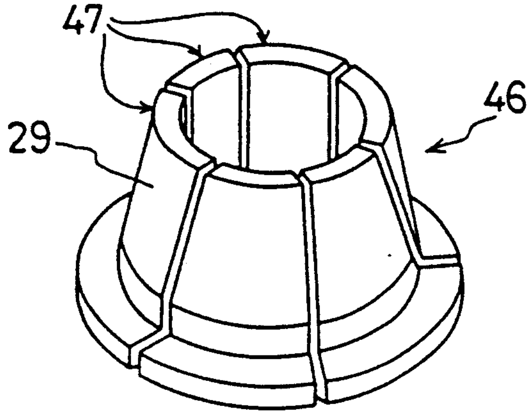

A sixth embodiment shown in FIGS. 10 and 11 is presented by modifying the first embodiment (refer to FIG. 1) as follows.

A collet 46 comprising a plurality of nail members 47 arranged in an annular manner is inserted between the large diameter bore portion 9*b* of the cylinder bore 9 and the first piston 11, and the locking wedge 31 of the second piston 17 is kept in contact with the wedge receiving surface 29 of each nail member 47. Incidentally, the locking wedgy space 30 is formed outside the outer periphery of the wedge receiving surfaces 29 in a forwardly tapered manner.

Seventh Embodiment

Figure 12:
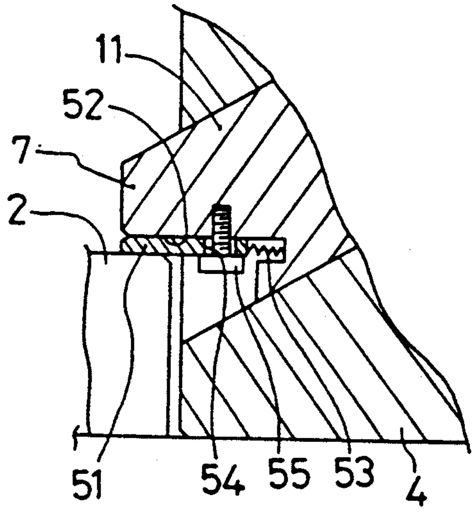
FIG. 12 shows a seventh embodiment of the present invention and is a partial view corresponding to FIG. 1.

In a seventh embodiment shown in FIG. 12, a sliding shuttle member 51 is interposed between the upper surface of the mold 2 and the clamping member 7 so as to be slidable within a certain extent in the fore and back direction. This shuttle member 51 is manufactured by plating a nitrided alloy steel and is resiliently urged forwardly by means of an advancement spring 53 under such a condition that it is inserted into a support groove 52 of the lower surface of the clamping member 7. A forward movement of the shuttle member 51 beyond a predetermined distance is prevented by means of a stopper pin 55 which is put through a play hole 54 thereof.

The shuttle member 51 operates as follows when being changed over from the illustrated clamping condition to the unclamping condition. When the first piston 11 is retracted backwardly acclivously, firstly a slip is caused between the shuttle member 51 frictionally fixed to the mold 2 and the clamping member 7 and then only the clamping member 7 is actuated backwardly acclivously leaving the shuttle member 51 behind. By means of the first piston 11 subsequently being retracted, the clamping member 7 and the shuttle member 51 are actuated for unclamping backwardly acclivoulsy so that the mold 2 can be unclamped. Thereby, the unclamping operation can be surely performed.

Incidentally, the respective above-mentioned embodiments may be further modified as follows.

Both or one of the push spring 39, 40 may be omitted. Instead that the clamping member 7 is actuated linearly by the first piston 11, the clamping member may actuated swingably as illustrated in the conventional embodiment or the balance-shaped clamping member may be actuated swingably. Further, the working fluid may be a pressurized air instead of the oil.

Many different embodiments of the present invention will be obvious to those skilled in the art, some of which have been disclosed or referred to herein, hence it is to be understood that the specific embodiments of the present invention as presented herein are intended to be by way of illustration only and are not limiting on the invention, and it is to be further understood that such embodiments, changes, or modifications may be made without departing from the spirit and scope of the invention as set forth in the claims appended hereto.

What is claimed is:

1. A clamping apparatus comprising:

a housing having a first end and a second end, said housing having a cylinder bore extending between said first and second ends;

a first piston for clamping a workpiece, said first piston having an unlocking portion, and a second piston for locking said first piston in a clamping position, said second piston being concentrically mounted with respect to a portion of said first piston such that said first and second pistons are coaxial within said cylinder bore so as to be hermetically slidable within said bore between said first and second ends;

a first actuation chamber located within said bore between said second end of said housing and said first and second pistons;

a clamping member connected to a first end portion of said first piston;

a second actuation chamber located between said first end of said housing and said second piston;

a clamp wedge surface located on an outer circumferential portion of saidd first piston, said wedge surface being tapered in a direction away from said clamping member;

a locking wedge carried by said second piston for engaging said wedge surface in a direction toward said clamping member under the influence of fluid introduced into said first actuation chamber;

and an engaging portion carried by said second piston for engagement with said unlocking portion on said first piston through the introduction of fluid into said second actuation chamber, whereby said locking wedge is disengaged from said wedge surface to allow said first piston to retract from said clamping position.

2. A clamping apparatus according to claim 1, wherein said cylinder bore (9) comprises a small diameter bore portion (9*a*) on the first end and a large diameter bore portion (9*b*) on the second end.

3. A clamping apparatus according to claim 2, wherein said large and small diameter bore portions (9*a*) are angled downwardly within said housing.

4. A clamping apparatus according to claim 3, wherein said clamping member (7) is fixedly secured to the first end portion of said first piston (11).

5. A clamping apparatus according to claim 1, wherein said second piston (17) is externally mounted with request to said first piston (11).

6. A clamping apparatus according to claim 5, further comprising a first spring (39) biasing said first piston (11) toward the first end.

7. A clamping apparatus according to claim 6, further comprising a second spring (40) biasing said second piston (17) toward the first end.

* * * * *